United States Patent [19]

Lee

[11] 4,453,524

[45] Jun. 12, 1984

[54] AIR CHARGER FOR INTERNAL COMBUSTION ENGINES

[76] Inventor: John K. Lee, 11909 Gainsborough Rd., Potomac, Md. 20854

[21] Appl. No.: 435,703

[22] Filed: Oct. 21, 1982

[51] Int. Cl.³ ............................................ F02M 31/00
[52] U.S. Cl. .................... 123/556; 123/549; 123/552
[58] Field of Search ............. 123/552, 556, 549, 559, 123/565

[56] References Cited

U.S. PATENT DOCUMENTS

| | | | |
|---|---|---|---|
| 1,347,043 | 7/1920 | O'Brien | 123/556 |
| 2,220,308 | 11/1940 | Whitman | 123/556 |
| 2,369,937 | 2/1945 | Baster | 123/556 |
| 2,756,730 | 7/1956 | Patchan | 123/556 |
| 2,781,032 | 2/1957 | Sebok | 123/556 |
| 3,397,684 | 8/1968 | Schuenberg | 123/556 |
| 3,990,421 | 11/1976 | Grainger | 123/556 |
| 4,020,815 | 5/1977 | Hubert | 123/556 |
| 4,047,511 | 9/1977 | Takagi | 123/549 |
| 4,096,697 | 6/1978 | Treuil | 123/556 |
| 4,365,607 | 12/1982 | Ishikawa | 123/556 |

Primary Examiner—Ronald H. Lazarus
Attorney, Agent, or Firm—Gerald J. Ferguson, Jr.; Joseph J. Baker

[57] ABSTRACT

An air charging system for an internal combustion engine is disclosed which includes an electric motor driven blower mounted on the air cleaner housing located at the air intake of either a carbureted or fuel injected engine. The blower forces either heated air during startup or unheated air during actual running to the engine to thereby boost the output power and reduce harmful emissions. The speed of the blower can be either manually controlled or controlled in conjunction with actuation of the engine's throttle.

7 Claims, 3 Drawing Figures

AIR CHARGER FOR INTERNAL COMBUSTION ENGINES

BACKGROUND OF THE INVENTION

This invention relates to a device for improving the air supply for internal combustion engines that are typically used in automotive vehicles.

Applicant is unaware of any device which can be easily and inexpensively attached to the housing of a conventional air filter associated with a typical vehicular internal combustion engine to significantly improve the output power and curtail harmful emissions by forcing a greater quantity of cool air into the engine than normally asperiated thereby.

It is well known in the art to supplement the air drawn into an internal combustion during normal operation by providing a separately driven blower which forces air, preheated by the heat of the engine, through an air filter located across the air intake of the engine to thereby increase its output power. U.S. Pat. No. 1,995,935 discloses the use of a centrifugal fan type blower which has its rotor attached directly to the crankshaft of the engine and forces air to both the cylinder walls as well as the intake of the carburetor to boost the engine's power. Such a system is too complex and would be totally impractical, if not impossible, to install on an engine of an present day automobile after its manufacture by one of average mechanical skill. U.S. Pat. No. 2,681,646 discloses a blower of the propeller type connected through a funnel shaped duct to the side of an internal combustion engine air filter housing. The propeller is rotated by a driving wheel in frictional engagement with the engine cooling fan belt. The air flow capable of being generated by a propeller fan of this nature and relative size would not appear to be capable of significantly increasing the output of an internal combustion found in present day automobiles. Nor would driving the propeller by the cooling fan belt be easily or relatively inexpensively accomplished by one of general mechanical skill due to the great variety of complex belt arrangements encountered on present day vehicular engines.

In contrast to the supplemental air systems of the prior art, a few of which were above described, applicant's invention has as its principal object the provision of a compact, relatively inexpensive electric motor driven centrifugal fan type blower which can be easily installed on any present day internal combustion engine located in a vehicle by one housing general mechanical skill.

It is another object of the present invention to provide a supplemental air system in the form of a blower which may be connected to the housing of an air filter without changing or replacing any of the engine parts on old or existing automotive engines.

It is a further object of the present invention to provide a device of the above mentioned character that will effect a substantial fuel economy, improved horsepower and reduced undesirable hydrocarbon emissions as a result of the increased quantity of air entering the carburetor.

It is still another object of the present invention to provide a device of the class described which includes a means for automatically selecting air from a source which has not been preheated and is cool relative to that air in the compartment enclosing the engine during normal operation.

It is yet another object of the present invention to provide a device of the class described which can be provided with either manual or accelerator actuated control and which is simple in its construction, compact, and comparatively economical in its manufacture, installation, operation and maintenance.

Other objects and advantages of my invention will be apparent during the course of the following description.

In the drawing forming a part of this specification and wherein like numerals and other characters of reference are employed to designate like parts throughout the same.

DETAILED DESCRIPTION OF INVENTION

Figure 1:
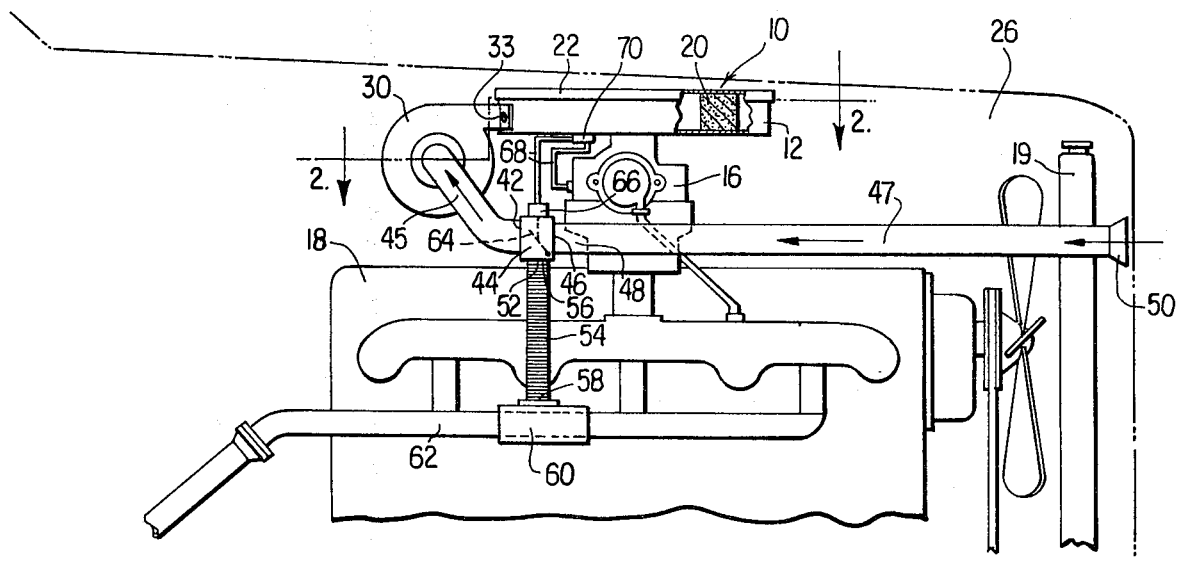
FIG. 1 is a side elevation of a device embodying my invention and showing the same associated with the air filter of an automotive vehicle.
Figure 2:
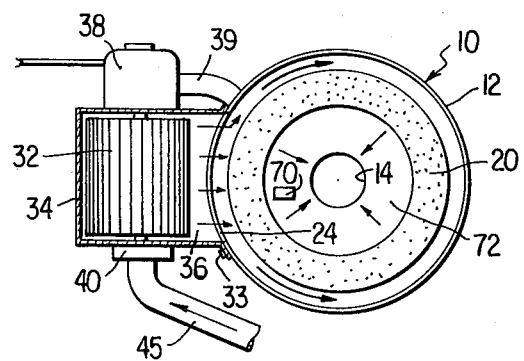
FIG. 2 is a cross-sectional view taken along lines 2—2 of FIG. 1.

Referring in detail to the drawing, 10 denotes an air cleaner of conventional construction having a lower housing portion 12 with an outlet 14. As shown in this embodiment of the invention, the outlet 14 is connected to the air inlet of a carburetor 16 connected to an internal combustion engine 18 of the gasoline type having a radiator 19. It being understood, of course, that the outlet 14 could as well be secured to the air inlet of a gasoline or diesel fuel injected engine. The air cleaner 10 also has a filter element 20 which is typically round and is located within the lower housing portion 12 and beneath a top or lid 22.

Prior to the installation of applicant's invention, the typical air cleaner 10 would be provided with a longitudinal opening 24 at which is attached a funnel-shaped air intake tube (not shown) extending from the opening 24 a distance into the engine compartment 26. On existing motor vehicles, the aforementioned air intake tube would be removed leaving only the opening 24 to enable air to enter the air cleaner 10. Heretofore, if the air intake tube was short, air in the compartment 26 preheated by the engine was drawn into the carburetor which was extremely hot particularly when stopped in traffic during the summer months or in warmer locations. Asperation by the engine of this hot air resulted in inefficient combustion of the fuel-air mixture with the resultant loss of power and increase in the discharge of harmful exhaust emission as well as an increase in the operating temperature of the engine. These undesireable operating conditions were not satisfactorily overcome by extending the air intake tube a distance to a location of unpreheated air because the friction resulting from the increased length of the tube resulted in a decrease in the amount of air actually reaching the engine thus having an undesirable effect on the operation of the engine.

To overcome the aforementioned differences in the systems of the prior art as above discussed, applicant provides a blower 30 having a centrifugal fan 32 rotatably mounted within a housing 34. The housing has an opening 36 which is aligned with the opening 24 in the air cleaner housing 12 and the blower is secured to the housing 12 by pivotable fasteners 33. The blower fan 32 is driven by an electric motor 38 in a manner to bae further described later. It is sufficient to say at this point that rapid rotation of the fan 32 draws air in large quantities through inlet 40 of the blower 30 and from there into the air cleaner 10 through opening 24. The inlet 40 is connected to the outlet side 42 of a two way air control valve 44 by conduit 45. A first inlet 46 of the control valve 44 has a conduit 47 connected thereto at one end 48 thereof, the other end 50 extending to an area outside of the engine compartment 26 whereby air unheated by the engine 18 will be drawn through the conduit 46 by the blower 30 when the control valve 44 is in a first position. A second inlet 52 of the control valve 44 has a conduit 54 connected thereto at one end 56 thereof, the other end 58 being connected to a heat exchanger 60. The heat exchanger 60 utilized the heat radiating from the engine exhaust manifold 62 to warm air drawn through it by the blower 30 when the control valve 44 is in a second position.

Typically, the control valve 44 would have a valve head 64 (see phantom lines) movable between the aforementioned first and second positions by means of a vacuum actuated valve head control mechanism 66. The mechanism 66 is connected to a source of vacuum at the carburetor 16 by means of tubing 68 by way of a thermostatically controlled valve 70 located in the lower housing portion 12. When the engine is cold such as initial starting, the valve 70 is actuated by the temperature of the cold air in the space 72 to the open position thereby permitting the vacuum from the carburetor to move the mechanism 66 and valvehead 64 such that preheated air from the heat exchanger 60 is forced into the engine 18 by the blower 30. This ensures a more rapid warmup of the engine 18 with a resultant reduction in the discharge of harmful emissions. Upon the engine reaching its operating temperature, the valve 70 would permit the mechanism 66 and valvehead 64 to permit air to be drawn into the engine 18 through conduit 47 by blower 30.

Figure 3:
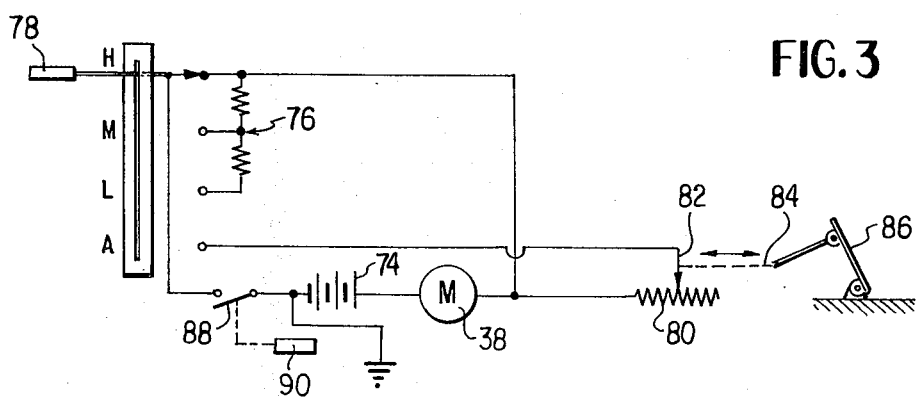
FIG. 3 is a schematic of a wiring diagram.

Referring now to FIG. 3, an electric control circuit is disclosed for the electric motor 38 which shows the motor 38 connected in series with the vehicle's battery 74. For strictly manual control of the speed of the motor 38, a variable resistance 76 is also connected in series with the battery 74 and motor 38. As the resistance 76 is increased by movement of a lever 78, the speed of the motor 38 is reduced in a well known manner. If it is desired to control the speed of the motor 38 as the throttle (not shown) of the carburetor 16 is opened, the lever 78 can be moved to a position (A) which cuts out the resistance 76 but connects in series with the motor 38 and battery 74, a second variable resistance 80. The resistance across the variable resistance 80 is adjustable by means of a lever 82 operatively connected to the linkage 84 from the throttle (not shown) to the accelerator pedal 86. Thus, as can be seen, the speed of the blower 30 and the air fed to the carburetor 16 of the engine can be manually controlled by lever 78 or by lever 82 and accelerator pedal 86. To insure that the blower 30 operates only after the engine 18 has reached the desired temperature, a thermostatically actuated switch 88 can be placed in series with the battery 74. The switch 88 would have a sensing element 90 in contact with the engine 18 itself or in the water coolout system (not shown).

It is to be understood that the form of my invention, herewith shown and described, is to be taken as a preferred example of the same and that various changes in the size, shape and arrangement of parts may be resorted to without departing from the spirit of my invention, or scope of the appended claims.

Having thus described my invention, I claim:

1. In an internal combustion engine having an air intake opening through which filtered air is fed to said engine, a removably mounted air filter contained in a housing having an outlet port on one side of said filter connected to said air intake opening and an inlet port on the other side of said filter, the improvement compressing an air charging system having:
    (a) an air blower having a discharge opening connected to said inlet port of said air filter housing and an air supply opening,
    (b) an air control valve, and an air conduit extending between said control valve and said air blower
    (c) a first conduit means extending at one end to a source of air unheated by said engine and connected at the other end to a first inlet of said air control valve,
    (d) a second conduit means extending at one end to a source of air heated by said engine and connected at the other end to a second inlet of said air control valve,
    (e) thermostatic controlled means for actuating said control valve to connect said supply opening with either said first or said second conduit depending on the operating temperature of said engine,
    (f) an electric motor operatively connected to said blower for driving same, and
    (g) means for controlling the speed of said electric motor and thus the quantity of air introduced into said engine to thereby increase the power and reduce the hydrocarbon emissions of said engine, said means including an electric storage battery and a manually controllable variable resistance means connected in series with said electric motor and said battery.

2. The system as set forth in claim 1 wherein said means for controlling said electric motor comprises an accelerator pedal, an electric storage battery, and said variable resistance means connected in series with said electric motor and said battery, said variable resistance means being controlled by the actuation of said accelerator pedal.

3. The system as set forth in claim 1 wherein said blower has said discharge opening mounted on said air filter housing.

4. The system as set forth in claim 1 wherein said source of air heated by said engine is a heat exchanger means associated with the exhaust system of said engine.

5. The system as set forth in claim 1 wherein said air blower is of the centrifugal fan type.

6. The system as set forth in claim 1 wherein said circuit means includes variable resistance means.

7. In engine having a radiator in front thereof and having an air intake opening through which filtered air is fed to said engine, a removably mounted air filter contained in a housing having an outlet port on one side of said filter connected to said air intake opening and an inlet port on the other side of said filter, the improvement comprising an air charging system having:
    (a) an air blower having a discharge opening connected to said inlet port of said air filter housing and an air supply opening,
    (b) an air control valve and an air conduit extending between said air control valve and said air blower, (c) a first conduit means extending at one end beyond said radiator and opening to a source of air unheated by said engine and connected at the other end to a first inlet of said air control valve, (d) a second conduit means extending at one end to a source of heated air in the form of a heat exchanger means associated with the exhaust system of said engine and connected at the other end to a second inlet of said air control valve, (e) thermostatic controlled means for actuating said control valve to connect said supply opening with either said first or said second conduit depending on the operating temperature of said engine, (f) an electric motor operatively connected to said blower for driving same, and (g) means for controlling the speed of said electric motor and thus the quantity of air introduced into said engine to thereby increase the power and reduce the hydrocarbon emissions of said engine, said means including an electric storage battery and a manually controllable variable resistance means connected in series with said electric motor and said battery.

* * * * *